US008379996B2

United States Patent
Murata et al.

(10) Patent No.: US 8,379,996 B2
(45) Date of Patent: Feb. 19, 2013

(54) IMAGE PROCESSING METHOD USING MOTION VECTORS, IMAGE PROCESSING DEVICE USING MOTION VECTORS, AND IMAGE PROCESSING PROGRAM USING MOTION VECTORS

(75) Inventors: Tsukasa Murata, Yamato (JP); Shigeru Doida, Machida (JP)

(73) Assignee: Nikon Corporation, Tokyo (JP)

( * ) Notice: Subject to any disclaimer, the term of this patent is extended or adjusted under 35 U.S.C. 154(b) by 1162 days.

(21) Appl. No.: 12/226,324

(22) PCT Filed: May 29, 2007

(86) PCT No.: PCT/JP2007/000575
§ 371 (c)(1),
(2), (4) Date: Oct. 15, 2008

(87) PCT Pub. No.: WO2007/148428
PCT Pub. Date: Dec. 27, 2007

(65) Prior Publication Data
US 2009/0279788 A1    Nov. 12, 2009

(30) Foreign Application Priority Data
Jun. 20, 2006  (JP) ................................ 2006-170419

(51) Int. Cl.
G06K 9/46 (2006.01)
G06K 9/36 (2006.01)
G06K 9/48 (2006.01)
(52) U.S. Cl. ........ 382/239; 382/240; 382/243; 382/199; 382/203

(58) Field of Classification Search ....................... None
See application file for complete search history.

(56) References Cited

U.S. PATENT DOCUMENTS

| 5,477,272 | A | * | 12/1995 | Zhang et al. | ............. 375/240.06 |
|---|---|---|---|---|---|
| 6,130,912 | A | * | 10/2000 | Chang et al. | ............. 375/240.16 |
| 6,463,164 | B1 | | 10/2002 | Chiu et al. | |
| 6,529,634 | B1 | * | 3/2003 | Thyagarajan et al. | ........ 382/239 |
| 6,901,110 | B1 | * | 5/2005 | Tsougarakis et al. | ..... 375/240.12 |
| 2001/0022815 | A1 | * | 9/2001 | Agarwal | .................. 375/240.16 |
| 2005/0226335 | A1 | * | 10/2005 | Lee et al. | ................. 375/240.16 |

FOREIGN PATENT DOCUMENTS

| JP | A-01-179584 | 7/1989 |
|---|---|---|
| JP | A-07-123411 | 5/1995 |
| JP | A-09-266575 | 10/1997 |
| JP | A-2002-518897 | 6/2002 |
| JP | A-2005-304035 | 10/2005 |

* cited by examiner

Primary Examiner — Tom Y Lu
Assistant Examiner — Thomas Conway
(74) Attorney, Agent, or Firm — Oliff & Berridge, PLC (57) ABSTRACT

An image processing method of finding a motion vector between an original image and a reference image, including dividing the original image to extract a block, searching for a similar region of the block from the reference image to detect a motion vector of the block, further dividing the block from which the motion vector has been detected to extract a lower block, and searching for a similar region to detect a motion vector of the lower block with a range in the vicinity of the motion vector found from the block before division as a start point. Thus, the method is characterized by reflecting a tree structure data of the motion vector obtained in this manner in the subsequent detection of motion vector.

8 Claims, 8 Drawing Sheets

EXAMPLE OF BLOCK DIVISION OF IMAGE

REGION IN WHICH MOTION VECTOR IS DETECTED AT DENSE INTERVALS

REGION IN WHICH MOTION VECTOR IS DETECTED AT SPARSE INTERVALS

IMAGE PROCESSING METHOD USING MOTION VECTORS, IMAGE PROCESSING DEVICE USING MOTION VECTORS, AND IMAGE PROCESSING PROGRAM USING MOTION VECTORS

CROSS-REFERENCE TO RELATED APPLICATION

This application is a U.S. National Stage application claiming the benefit of prior filed International Application Number PCT/JP2007/000575, filed May 29, 2007, in which the International Application claims a priority date of Jun. 20, 2006 based on prior filed Japanese Application No. 2006-170419, the entire contents of which are incorporated herein by reference.

TECHNICAL FIELD

The present invention relates to an image processing method, an image processing device, and an image processing program that detect a motion vector of a subject from a plurality of images.

BACKGROUND ART

Conventionally, image processing techniques have been developed, which find a motion vector of a subject from among a plurality of images.

For example, a technique to roughly detect a motion vector in an image the resolution of which has been reduced, and then to detect with high precision a motion vector in an image of high resolution (Patent Document 1) and a technique to detect a motion vector of an image by comparing projection components of an image (Patent Document 2) have been disclosed.

Patent Document 1: U.S. Pat. No. 5,477,272
Patent Document 2: U.S. Pat. No. 6,463,164

DISCLOSURE

Problems to be Solved

However, in the prior art described in Patent Document 1, it is necessary to create a plurality of images of different resolutions and to detect a motion vector for each of the images. Consequently, there has been a problem that the processing load becomes heavy. In addition, it is also necessary to store each of the images of different resolutions and there has been a problem that a large memory capacity is necessary at the time of processing.

In the prior art described in Patent Document 2, when a motion vector is detected for a small subject, it is necessary to reduce a block size for which projection components are calculated. However, if the block size is reduced, the ratio of the subject components to the projection components is reduced, and therefore, there has been a problem that a motion vector of the subject cannot be detected accurately.

A proposition of the present invention is to efficiently detect a motion vector of a subject in an image.

Means for Solving the Problems

In order to solve the above-mentioned problems, an image processing method according to claim 1 is an image processing method of finding a motion vector between an original image and a reference image and characterized by including a step of dividing the original image to extract a block, a step of searching for a similar region of the block from the reference image to detect a motion vector of the block, a step of further dividing the block into smaller lower blocks to extract the lower block, and a step of searching for a similar region of the lower block from the reference image to detect a motion vector of the lower block with a range in the vicinity of the motion vector of the block, which is a division source, as a start position, and holding the obtained motion vector of the lower block in a tree data structure.

An image processing device according to claim 2 is an image processing device that finds a motion vector between an original image and a reference image and characterized by including an extraction unit that divides the original image to extract a block and a search unit that searches for a similar region of the block from the reference image to detect a motion vector of the block, wherein the extraction unit further divides the block into smaller lower blocks to extract the lower block and the search unit searches for a similar region of the lower block from the reference image to detect a motion vector of the lower block with a range in the vicinity of the motion vector of the block, which is a division source, as a start position, and holds the obtained motion vector of the lower block in a tree data structure.

An image processing device according to claim 3 is characterized by further including an edge judgment unit that suspends the detection of motion vector of the lower block on a suspensive condition that an amount of edge components included in the lower block becomes smaller than a predetermined threshold value in the image processing device according to claim 2.

An image processing device according to claim 4 is characterized by further including an alignment judgment unit that suspends the detection of motion vector relating to the lower block on a suspensive condition that a change of the motion vector of the lower block has aligned within a predetermined allowable amount in the image processing device according to claim 2 or claim 3.

An image processing device according to claim 5 is characterized in that the search unit further includes a detection continuation unit that continues the detection of motion vector until the size of the lower block becomes a predetermined size Sa or less irrespective of the suspensive condition in the image processing device according to claim 3 or claim 4.

An image processing device according to claim 6 is characterized in that the search unit further includes a region search unit that searches for the similar region from the comparison of projection components of the image feature amount when the size of the lower block is larger than a predetermined size Sb, and searches for the similar region from the spatial comparison of the image when the size of the lower block is smaller than the size Sb in the image processing device according to any of claim 2 to claim 5.

An image processing device according to claim 7 is characterized by further including a data structure conversion unit that converts the tree data structure of the motion vector into a data structure of the motion vector for each of the blocks, which is obtained by equally dividing the original image into those of a predetermined size, in the image processing device according to any of claim 2 to claim 6.

An image processing program according to claim 8 is characterized by causing a computer to function as the image processing device according to any of claim 2 to claim 7.

According to the present invention, it is possible to efficiently detect a motion vector for a block to be obtained by hierarchically dividing an image.

DESCRIPTION OF THE EMBODIMENTS

First Embodiment

Figure 1:
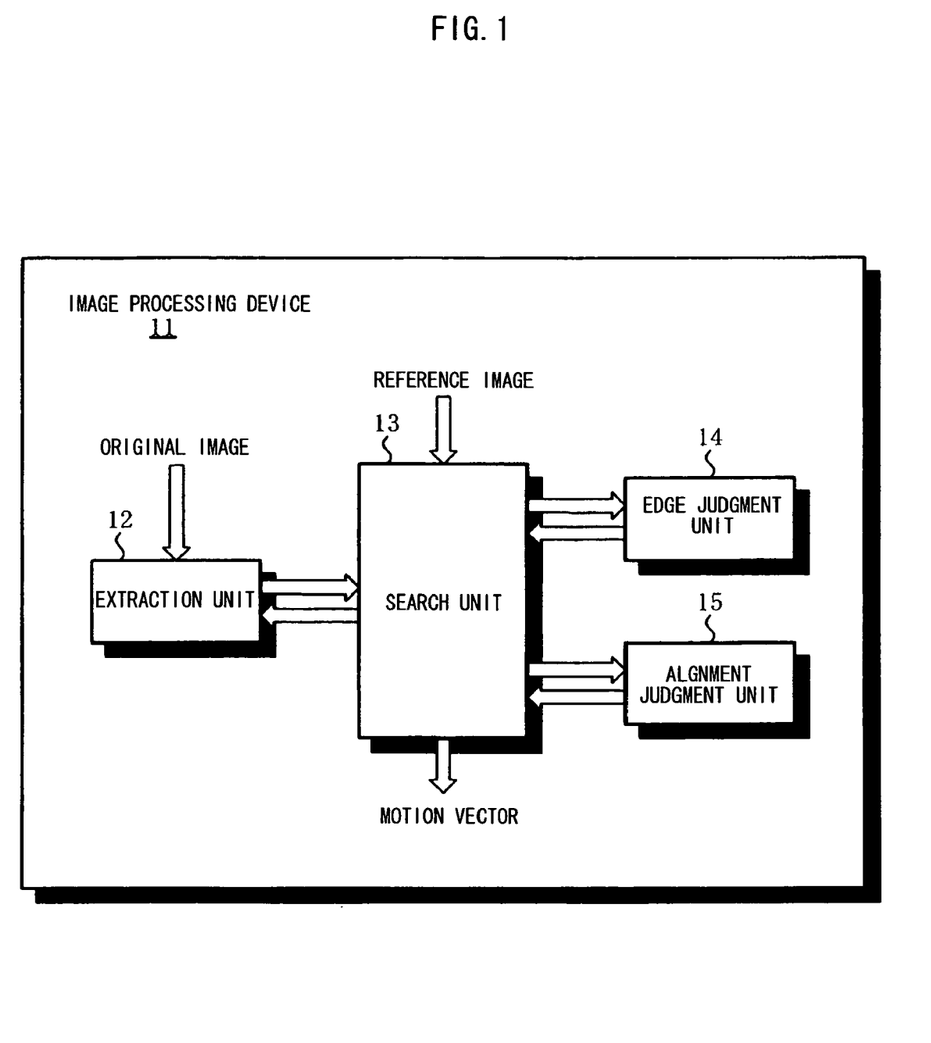
FIG. 1 is a block diagram showing a configuration of an image processing device according to a first embodiment of the present invention.
Figure 2:
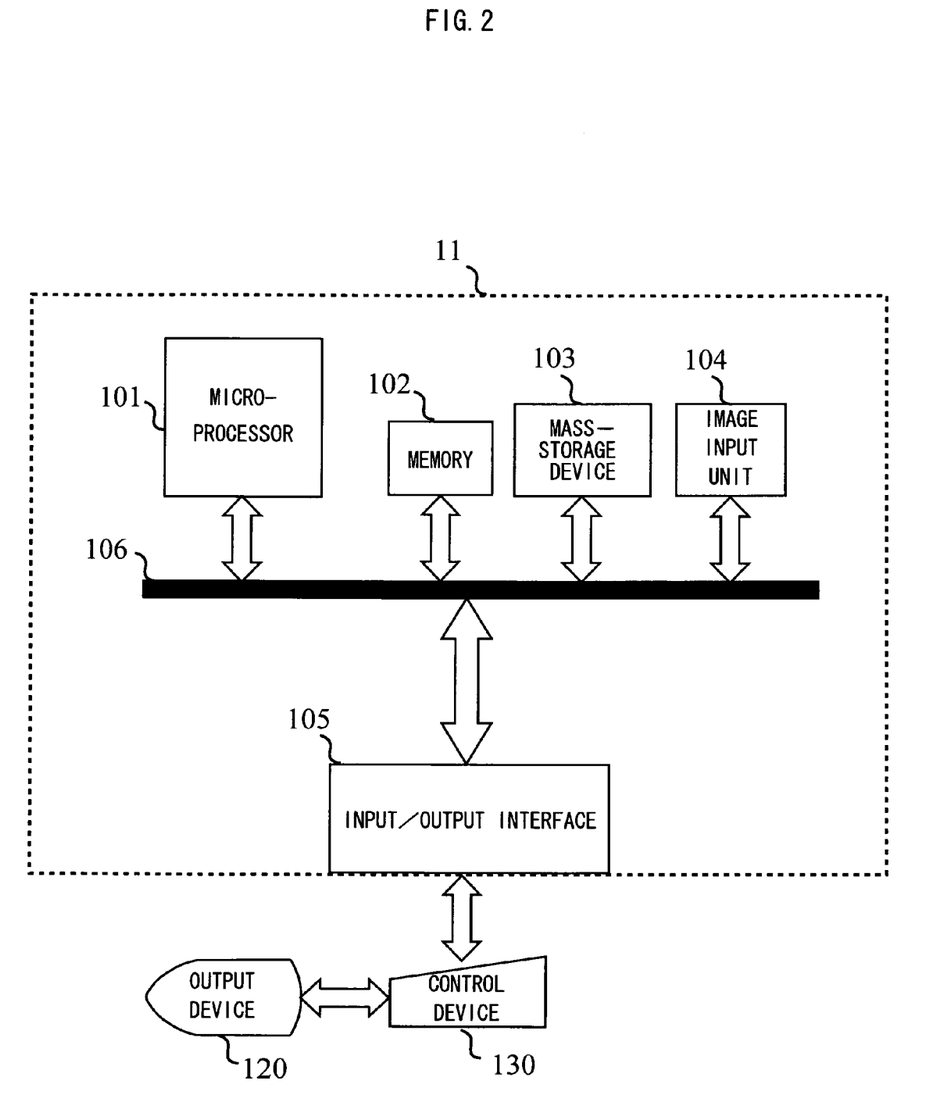
FIG. 2 is a block diagram showing a specific example of a configuration of the image processing device according to the first embodiment of the present invention.

FIG. 1 is a block diagram showing a configuration of an image processing device 11 according to a first embodiment and FIG. 2 is a block diagram showing a configuration at the time of implementation.

As shown in FIG. 1, an extraction unit 12 divides an original image hierarchically and extracts blocks sequentially. A search unit 13 searches for a similar region from a reference image for each of the extracted blocks and detects a motion vector for each block. An edge judgment unit 14 finds an amount of edge components included in each block and when the edge amount is smaller than a predetermined threshold value, it suspends the detection of motion vector. An alignment judgment unit 15 suspends the detection of motion vector when the motion vector of the block for which the edge amount was found is smaller than that of a larger upper block or its neighboring parallel block as the result of the comparison between them.

The first embodiment will be described below in detail with reference to FIG. 2. As shown in FIG. 2, the image processing device 11 according to the first embodiment includes a microprocessor 101, a memory 102, a mass-storage device 103, an image input unit 104, and an input/output interface 105. These components are coupled via a bus 106 so that information can be transmitted. Further, the image processing device 11 is coupled to a control device 130 via the input/output interface 105. To the control device 130, an output device 120 is coupled.

The microprocessor 101 receives a start instruction and an initial setting of image processing from the control device 130 via the input/output interface 105 and executes an image processing program held in the memory 102. The microprocessor 101 reads image data stored in the mass-storage device 103 or the image input unit 104 appropriately and carries out image processing. The result of processing is saved in the mass-storage device 103 and at the same time, is returned to the control device 130 via the input/output interface 105 and displayed on the output device 120. For the microprocessor 101, a general CPU can be used.

The memory 102 is used to hold the image processing program and to temporarily store various kinds of data from each component. For the memory 102, a general semiconductor memory can be used.

The mass-storage device 103 stores and holds image data to be processed by the image processing program and the result of processing. The image data is held in various formats, such as a bitmap format, jpeg format, and tiff format. The data held by the mass-storage device 103 is read appropriately by the microprocessor 101 via the input/output interface 105. For the mass-storage device 103, a mass-storage device, such as a general hard disc device and magneto-optic disc device, can be selected and used.

The image input unit 104 inputs image data to be processed. The image data input from the image input unit 104 may be transferred to the mass-storage device 103 and held therein or may be read directly by the microprocessor 101. As the image input unit 104, a general image input device, such as a scanner, digital camera, and digital video, or a memory card etc. that can be detached can be selected for use appropriately.

The input/output interface 105 is used to transmit the start instruction and the initial setting of image processing from the control device 130 to the microprocessor 101 and conversely, to send the result of processing from the microprocessor 101 to the control device 130.

The output device 120 displays the progress of image processing and its result the control device 130 receives from the microprocessor 101 as information that a user can check. For the output device 120, a monitor, printer, etc., can be used.

Using the control device 130, a user can start execution of the program, perform the initial setting of image processing, etc. For the control device 130, a general personal computer etc. can be selected for use appropriately.

Figure 3:
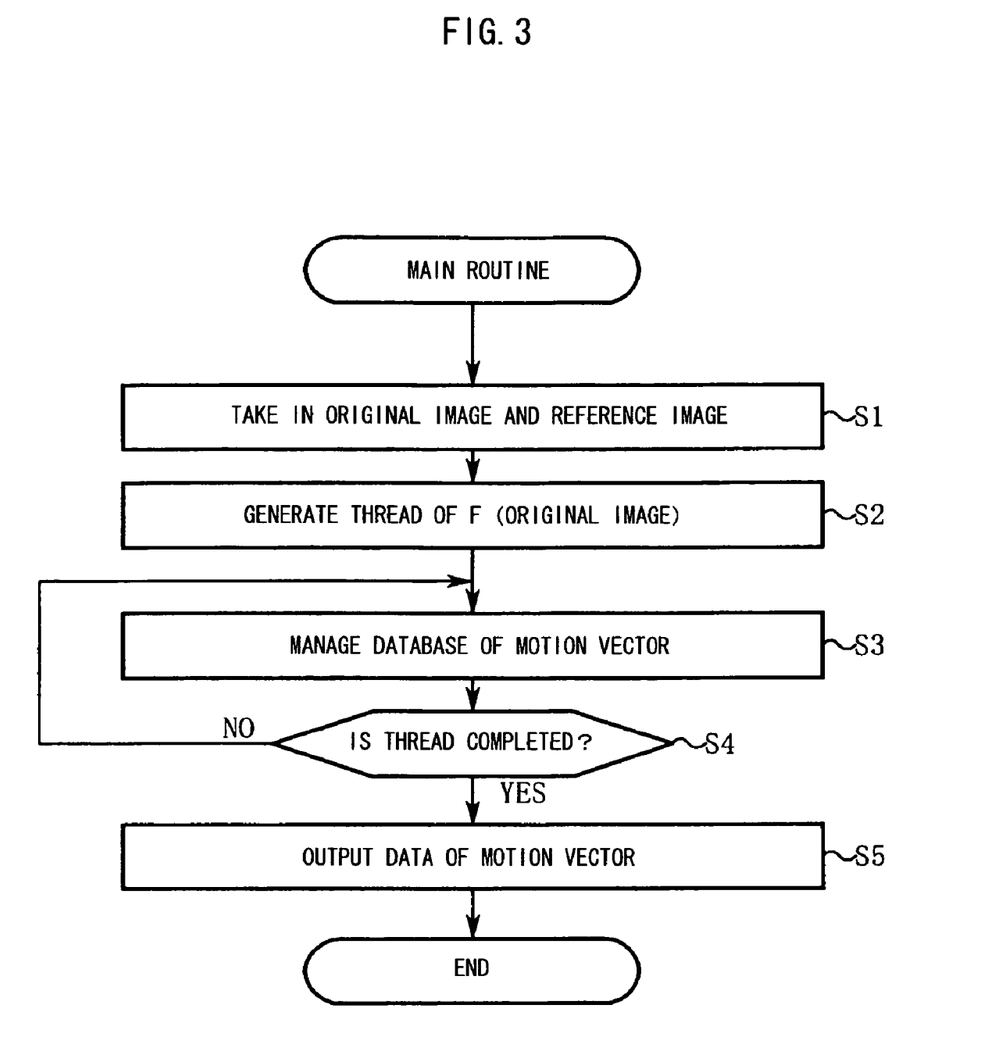
FIG. 3 is a flowchart diagram of processing of a main routine of the image processing device according to the first embodiment of the present invention.

An image processing method using the image processing device 11 will be described below along the step numbers shown in the flowchart in FIG. 3.

The image processing method includes a step of inputting an original image and a reference image (step S1), a step of generating a thread of F (original image) (step S2), a step of managing a database of motion vectors (step S3), a step of determining the completion of thread processing (step S4), and a step of outputting data of motion vectors (step S5), and is executed by sequentially carrying out each step.

Specifically, a user inputs a command of an image processing program along with the initial setting of image processing etc. from the control device 130 to issue the start instruction. The microprocessor 101 of the image processing device 11 receives the instruction through the input/output interface 105 and executes the image processing program stored in the memory 102. As a result, the processing from step S1 to step S5 is carried out.

In step S1, the microprocessor 101 reads the reference image and the original image from the mass-storage device 103 and stores them temporarily in the memory 102. It may also be possible to store the reference image and the original image as they are, or store the edge components of the reference image and the original image. Consequently, it is possible to omit edge extraction processing in units of blocks, to be described later.

In step S2, a thread is generated, a function F ( ), to be described later, is called with an argument for call by reference of the reference image etc. attached, and as a result, in the thread, the hierarchical detection operation of motion vector is executed sequentially. The progress of processing is returned to the control device 130 via the input/output interface 105 and output to the output device 120.

In step S3, the motion vector sequentially detected in the thread is managed in database.

In step S4, upon receipt of the report of completion of the thread from the thread side, the operation moves to step S5. On the other hand, when the processing of the thread is not completed, the operation is returned to step S3.

Figure 7:
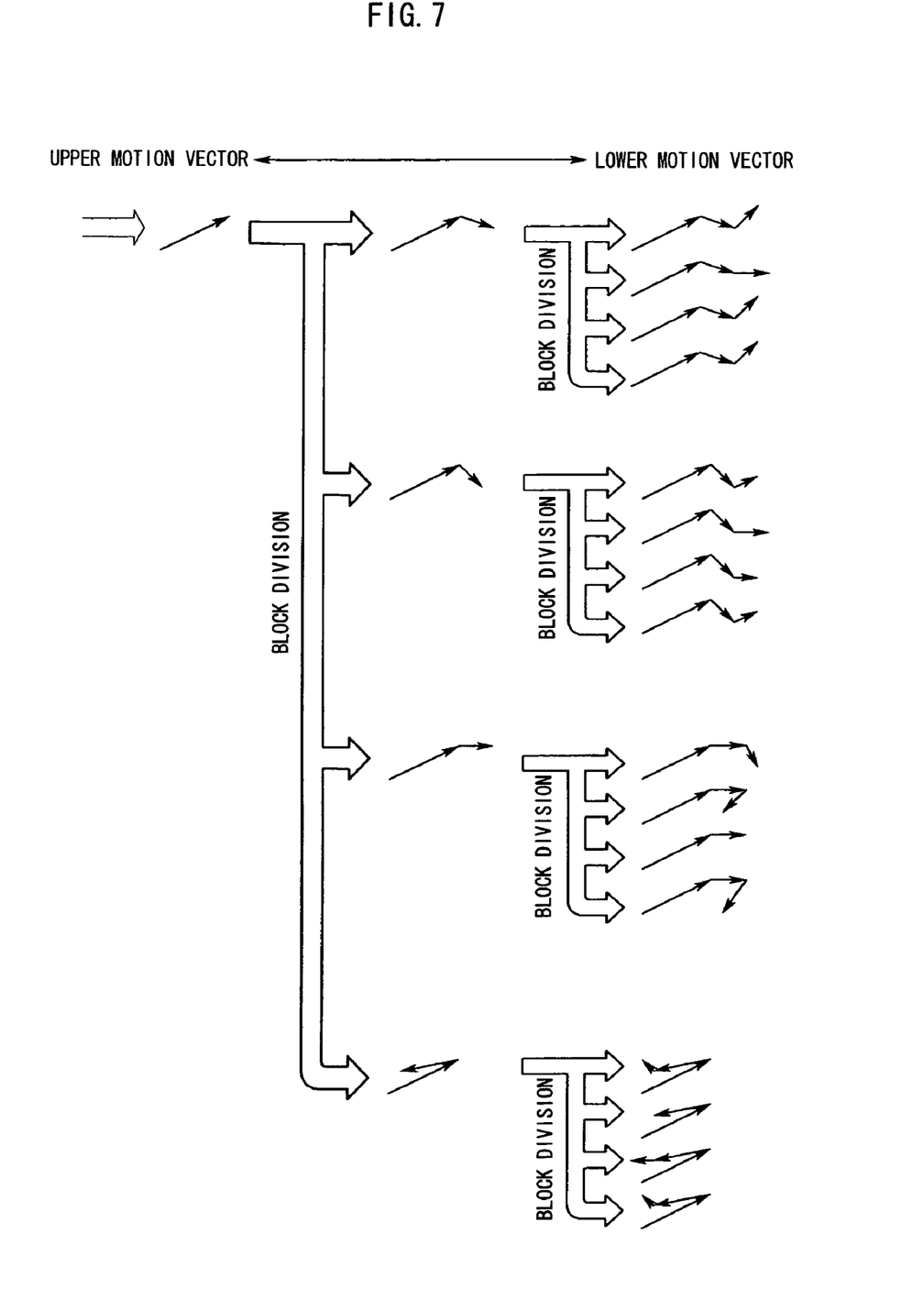
FIG. 7 is a diagram schematically showing an example of a tree data structure of motion vectors.

In step S5, the data of the motion vectors registered in the database is tree-structured in accordance with the division hierarchy of the corresponding block. Finally, the tree-structured data of the motion vectors is saved in the mass-storage device 103 and at the same time, is returned to the control device 130 via the input/output interface 105 and displayed on the output device 120, for example, as shown in FIG. 7. FIG. 7 schematically shows an example of the tree structure data. It is possible to make the detection of motion vector efficient by carrying out the processing control (such as to abort the detection of motion vector, to change the detection method, etc.) of the function F (block) in a lower hierarchy in accordance with the tree structure data.

Figure 4:
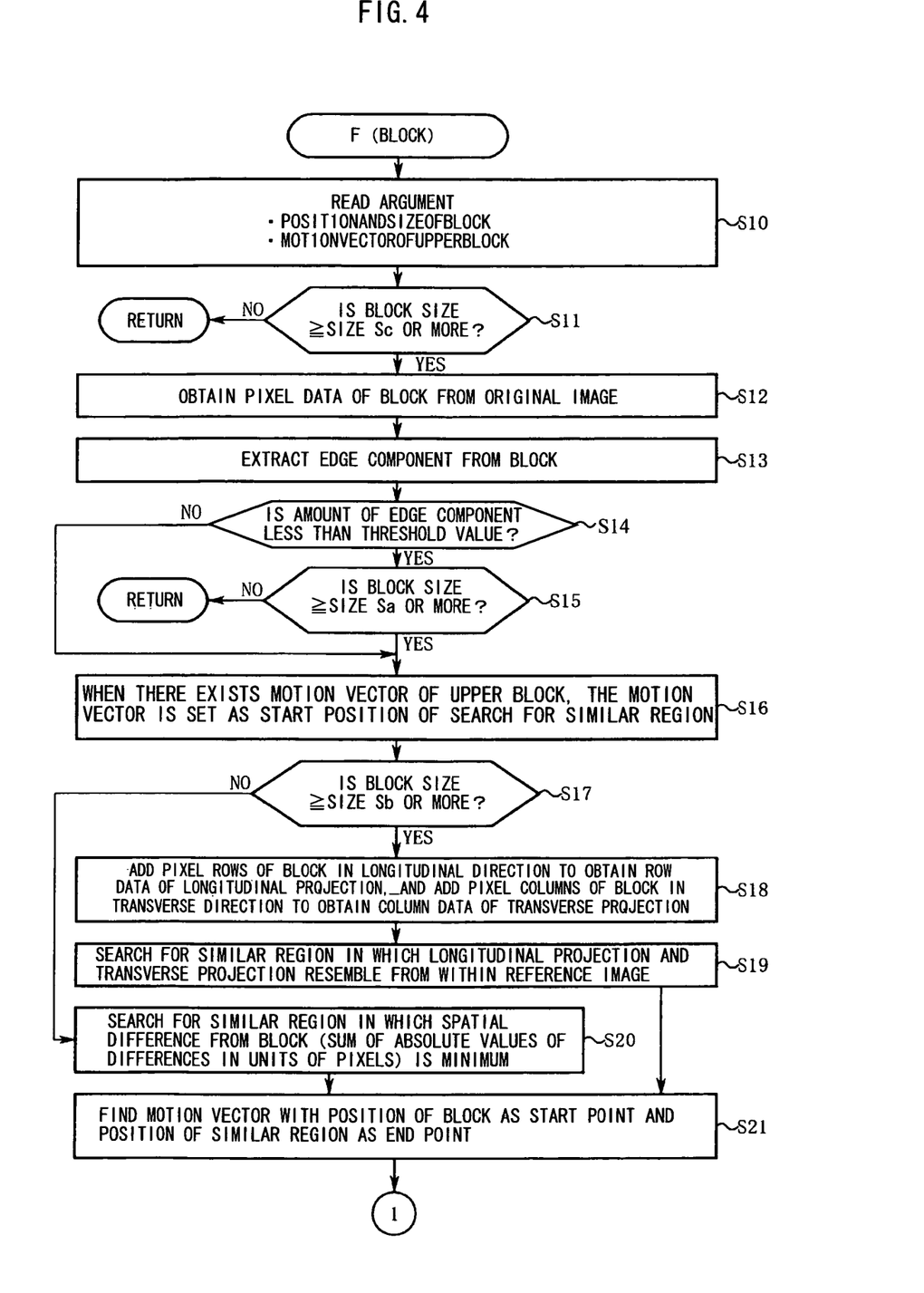
FIG. 4 is a flowchart diagram (1/2) of processing of a function F (block).
Figure 5:
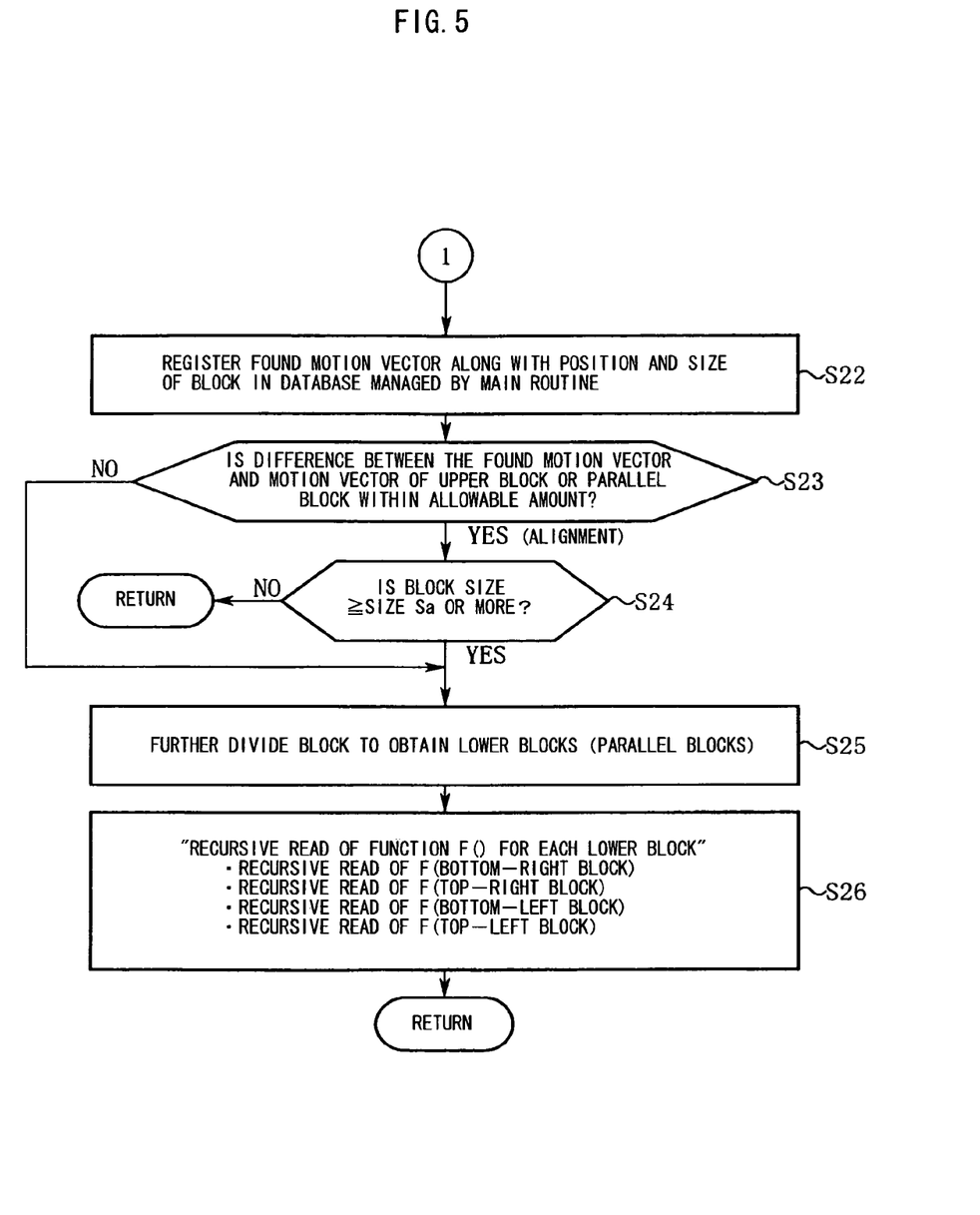
FIG. 5 is a flowchart diagram (2/2) of processing of the function F (block).

Specific processing control of the function F (block) in step S2 will be described along the step numbers shown in the figure using the flowchart in FIG. 4 and FIG. 5.

In step S10, the argument to be given to the function F (block) is read. The argument includes the position of the block (for example, the coordinates of a point in the upper-left of the block) and the block size (for example, the number of vertical and horizontal pixels) in the original image. Further, when the motion vector of an upper block that includes the block is already known, the data of the motion vector is also included in the argument.

In step S11, whether or not the block size of the argument is larger than a predetermined size Sc is determined. The size Sc defines the block size of the minimum unit for which the detection of motion vector is carried out. When the block size of the argument is greater than the size Sc, the operation moves to step S12 in order to carry out the detection of motion vector. On the other hand, when the block size of the argument is smaller than the size Sc, the operation is returned to the step that has read the function F (block). By this return processing, the hierarchical detection operation of motion vector is terminated before the block is miniaturized excessively.

In step S12, the pixel data of the block is obtained from the original image.

In step S13, the edge component is extracted from the pixel data of the block using a spatial frequency filter. Then, the sum of absolute values of the edge components of the block is found and set to an amount of edge components.

In step S14, whether or not the amount of edge components of the block is smaller than a predetermined threshold value is determined. The threshold value defines the recommended lower limit value of the edge amount desirable to detect a motion vector. When the amount of edge components included in the block is larger than the threshold value, the operation moves to step S16. On the other hand, when the amount of edge components included in the block is smaller than the threshold value, the operation moves to step S15.

In step S15, whether or not the block size is a predetermined size Sa or more is determined. The size Sa defines the block size for which the detection of motion vector should be continued irrespective of the suspensive condition in step S14. When the block size is the predetermined size Sa or more, the operation moves to step S16 in order to detect a motion vector. On the other hand, when the block size is smaller than the size Sa, the operation is returned to the step that has read the function F (block). By this return processing, the hierarchical detection operation of motion vector is terminated in order of blocks in which the amount of edge components becomes small.

In step S16, when the motion vector with respect to the upper block including the block is already known, the motion vector is set to the start position of the search for a similar region.

In step S17, whether or not the block size is a predetermined size Sb or more is determined. The size Sb indicates a rough estimate when to switch the search method of a similar region to another and it is preferable to decide the size while taking into consideration the compatibility between the individual search methods and the block size. When the block size is the predetermined size Sb or more, the operation moves to step S18. On the other hand, when the block size is smaller than the size Sb, the operation moves to step S20.

In step S18, because the block size is large, an attempt is made to reduce the processing load by searching for a similar region based on the comparison of the projection components. First, the pixel rows of the block (or edge component) are sequentially added in the longitudinal direction to obtain row data corresponding to the longitudinal projection. In the similar way, the pixel columns of the block (or edge component) are sequentially added in the transverse direction to obtain column data corresponding to the transverse projection.

In step S19, a similar region that resembles the longitudinal projection and the transverse projection found in step S18 is searched for from within the reference image. After the search operation, the operation moves to step S21.

In step S20, a similar region in which a spatial difference from the block (sum of absolute values of difference in units of pixels) becomes local minimum is searched for from within the reference image.

In step S21, a motion vector is found with the position of the block as its start point and the position of the similar region found in step S19 or step S20 as its end point.

In step S22, the motion vector found in step S21 and the position and size of the block are registered in the database managed by the image processing device 10.

In step S23, a difference is found between the motion vector of the upper block or neighboring parallel block and the motion vector found in step S21. When the magnitude of the difference between the motion vectors falls within the allowable amount of error etc., it is determined that the change of the motion vector has aligned and then the operation moves to step S24. On the other hand, when the magnitude of the difference between the motion vectors exceeds the allowable amount of error etc., it is determined that the detection of motion vector needs to be continued and then the operation moves to step S25.

In step S24, whether or not the block size is the predetermined size Sa or more is determined. The size Sa defines the block size for which the detection of motion vector should be continued irrespective of the suspensive condition in step S23. When the block size is the predetermined size Sa or more, the operation moves to step S25 in order to continue the detection of motion vector. On the other hand, when the block size is smaller than the size Sa, the operation is returned to the step that has read the function F (block). By this return processing, the hierarchical detection operation of motion vector is terminated in order of blocks in which the motion vector has aligned earlier.

In step S25, by dividing the block into, for example, 2×2 parts, lower blocks (parallel blocks) are obtained. The pattern of division and the number of divisions may be flexibly changed in accordance with the tree structure data of motion vectors. For example, it is possible to increase the number of divisions of the block in the upper hierarchy and reduce the number of divisions of the block in the lower hierarchy. By such processing control, it is possible to prevent the hierarchy of motion vectors from becoming too deep.

In step S26, the recursive read of the function F (block) is carried out for each of the lower blocks divided in step S25. When all of the recursive reads are restored, the operation is returned to the step that has read the function F (block).

As described above, in the first embodiment, while the division of the original image is repeated hierarchically, a motion vector is detected. Consequently, it is made possible to detect a motion vector while moving from a large block to a small block hierarchically.

Further, in the first embodiment, it is not necessary in particular to convert the resolution of the original image and reference image. Consequently, it is made possible to omit the processing load of resolution conversion compared to the prior art described in Patent Document 1.

In the first embodiment, a range in the vicinity of the motion vector of the upper block is taken as the search start position of a motion vector of the lower block. In this case, it is made possible to start search from a position near the correct answer and therefore to efficiently reduce the number of times of search for a motion vector. As a result, it is possible to reduce the time required for the detection of motion vector.

Figure 6:
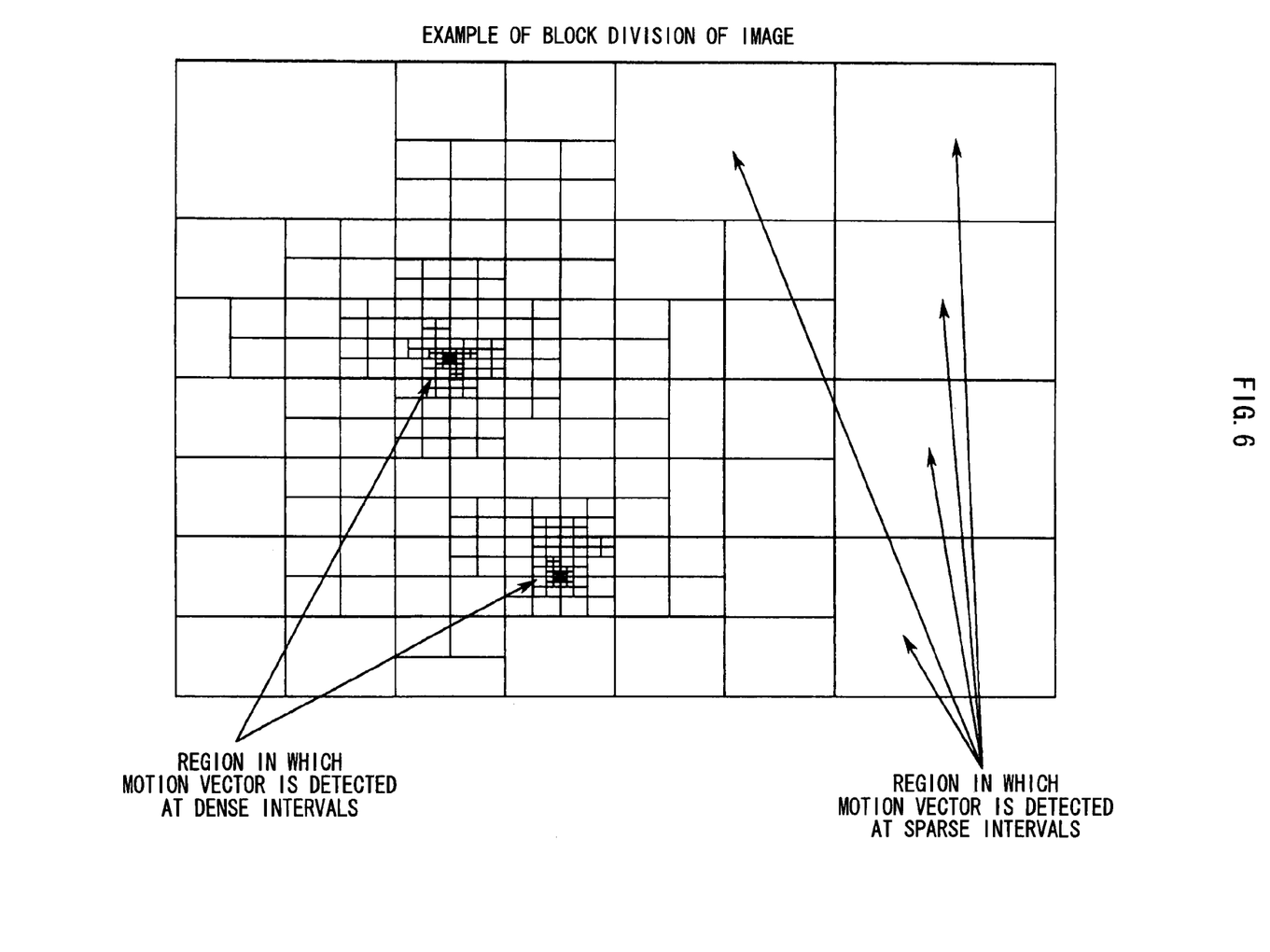
FIG. 6 is a diagram showing an example of block division of an image.

Furthermore, in the first embodiment, by providing the suspensive condition (steps S14, S23), the detection of motion vector is terminated at a proper depth of hierarchy. As a result, as shown in FIG. 6, it is possible to correctly judge the region in which a motion vector should be detected at dense intervals and the region in which detection can be made at sparse intervals in accordance with the pattern of the image.

For example, in step S14, on the suspensive condition that the amount of edge components included in the block becomes small, the update of the motion vector relating to the lower block is suspended. Consequently, in a region in which the amount of edge components is small, such as the part of the blue sky, the block division will not result in a wastefully small size and it is possible to avoid the detection of unwanted motion vector. As a result, it is possible to reduce the time required for the detection of motion vector.

In step S23, on the suspensive condition that the change of the motion vector has aligned, the update of the motion vector relating to the lower block is suspended. As a result, in a region in which the motion vectors are uniform, the block division will not result in a wastefully small size and it is possible to avoid the detection of unwanted motion vector. As a result, it is possible to reduce the time required for the detection of motion vector.

Further, in the first embodiment, it is possible to carry out the processing with a small memory by using an image of low resolution for the initial detection of motion vector, and its implementation is made easier.

Furthermore, in the first embodiment, a proper method is selected in accordance with the block size to detect a motion vector. That is, when the block size is large, a motion vector is detected based on the projection component in order to reduce the processing load. On the other hand, when the block size becomes small, a motion vector is detected based on the spatial difference of the image in order to improve the detection accuracy.

In the first embodiment, the example is described in which the function F ( ) for recursive read is used. However, the present invention is not limited to this. It may also be possible to individually detect a motion vector for each block by dividing the original image hierarchically.

In the first embodiment, the example is described in which division is made into rectangular blocks (refer to FIG. 6). However, the present invention is not limited to this shape of block. For example, it may also be possible to generate a block having a contour shape of a subject or subject part by dividing the block along the edge.

In the first embodiment, for simplicity of description, the detection method of motion vector is described specifically. However, the present invention is not limited to the specific detection method.

In the first embodiment, the example is described in which the resolution conversion is not carried out. However, the present invention is not limited to this. For example, it is also possible to roughly detect a motion vector by reducing the resolution of a large block appropriately.

In the first embodiment, when searching for a motion vector with a tree structure, it may also be possible to detect a motion vector using a thinned image, reduced image, or an image from which the feature amount has been thinned out if the original image, the reference image, or both are large.

In the first embodiment, the control device 130 is coupled with the image processing device 11 for use, however, the present invention is not limited to this. For example, it may also be possible to include and use the control device 130 along with the output device 120 within the image processing device 11.

Second Embodiment

In the first embodiment, a motion vector is output in a tree data structure finally. However, there may be the case where a data structure that gives a motion vector for each of the blocks divided at equal intervals is more convenient in actual use. As a second embodiment, a method will be described, which outputs a motion vector in a tree data structure after converting the structure into that in a data structure that gives a motion vector for each of the blocks, which is obtained by equally dividing the original image into those of a predetermined size, by making use of the present invention.

As an image processing device according to the second embodiment, the image processing device 11 according to the first embodiment can be basically used as it is. Specifically, a user inputs a command of an image processing program along with the initial setting of image processing etc. to issue the start instruction from the control device 130. The microprocessor 101 of the image processing device 11 receives the instruction via the input/output interface 105 and executes the image processing program stored in the memory 102. As a result, as in the first embodiment described above, the processing from step S1 in FIG. 3 starts. The processing up to step S5 is the same as that in the first embodiment and its detailed description is omitted.

The second embodiment differs from the first embodiment in that a part is added, in which the image processing program in the memory 102 carries out the conversion processing to convert the motion vector in a tree data structure found up to step S5 into that in a data structure that gives a motion vector for each of the blocks, which is obtained by equally dividing the original image into those of a predetermined size.

Figure 8:
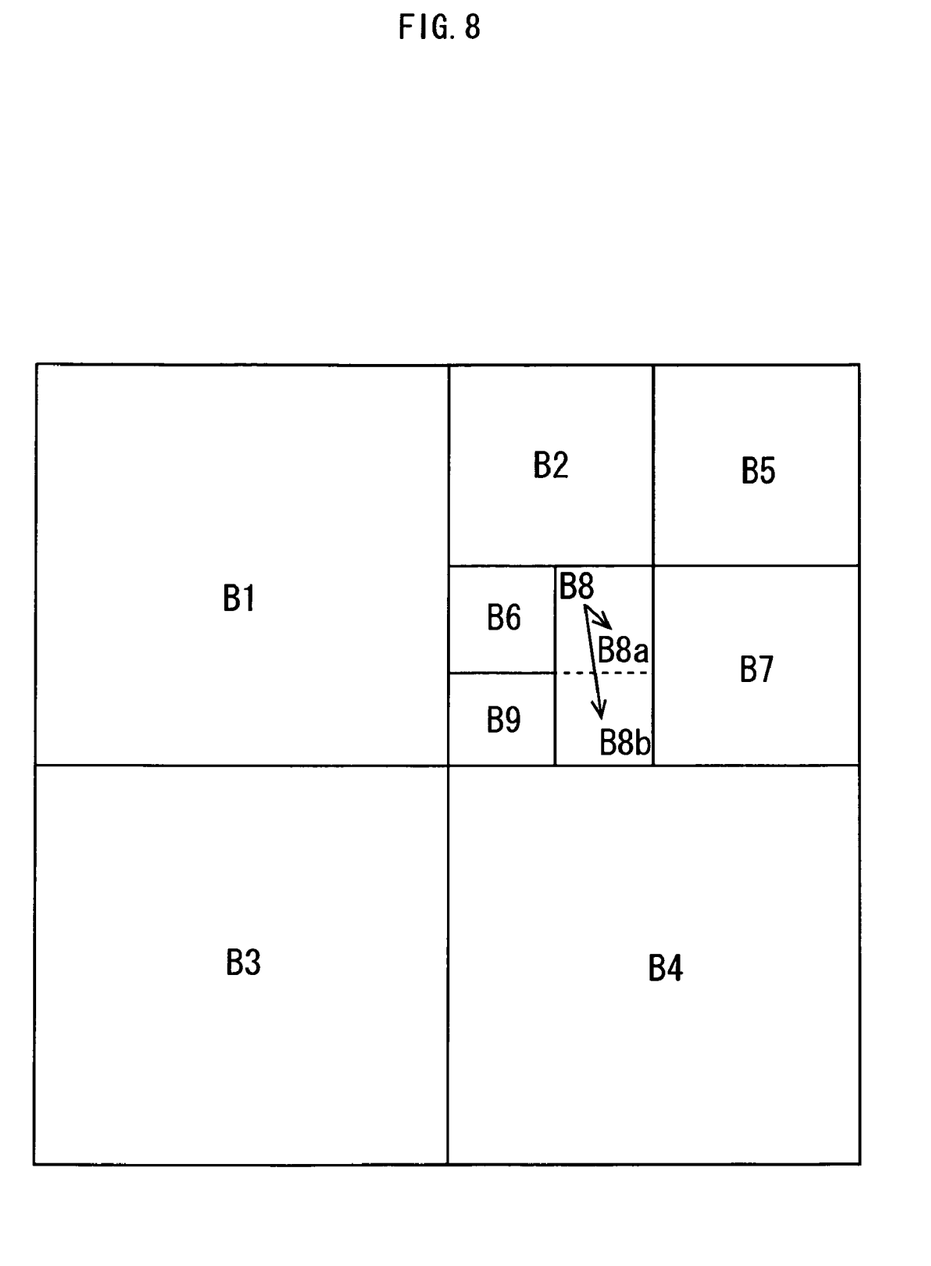
FIG. 8 is a diagram showing a conversion procedure from a tree structure of motion vectors into a data structure for each of blocks at equal intervals.

The conversion processing will be described below with reference to FIG. 8. As shown in FIG. 8, it is assumed that, as a result of finding of the motion vector from the original image and the reference image, the original image is divided, for example, into blocks B1 to B9 of various sizes and the motion vector in each of the blocks is held in a tree data structure.

It is assumed that, as a predetermined size, for example, a size of 16×16 pixels is specified and the block B6 or block B9 has that size. Since the block B8 has twice the size of the block B6 and block B9, the block B8 can be equally divided into a block 8a and a block 8b. From the motion vector in a tree data structure, the motion vector of the block B8 can be found and it is given as a motion vector of the block B8a and the block B8b, respectively. Such processing is carried out similarly for all of the other blocks and finally, the data is converted into the one having a data structure of the motion vector for each of the blocks, which is obtained by equally dividing the original image into 16×16 pixels, and output. Note that the user can specify the predetermined size directly to the image processing program from the control device 130 before the image processing starts or during the period thereof.

As described above, in the second embodiment, it is possible to detect a motion picture at high speed and convert the detected local motion vector into a format in conformity with the standards of MPEG etc. because a motion vector is found for each of the blocks, which is obtained by dividing the original image at equal intervals using the motion vector with a tree structure.

The many features and advantages of the embodiments are apparent from the detailed specification and, thus, it is intended by the appended claims to cover all such features and advantages of the embodiments that fall within the true spirit and scope thereof. Further, since numerous modification and changes will readily occur to those skilled in the art, it is not desired to limit the inventive embodiments to exact construction and operation illustrated and described, and accordingly all suitable modifications and equivalents may be resorted to, falling with the scope thereof.

The invention claimed is:

1. An image processing method of finding a motion vector between an original image and a reference image, comprising:

dividing said original image to extract a block;

searching for a similar region of said block from said reference image from a comparison of projection components of an image feature amount of said reference image and said block when a size of said block is larger than a predetermined size Sb and searching for said similar region from a spatial comparison of said reference image and said block when the size of said block is smaller than said size Sb to detect a motion vector of said block;

further dividing said block into smaller lower blocks to extract said lower block; and searching for a similar region of said lower block from said reference image from a comparison of projection components of an image feature amount of said reference image and said lower block when a size of said lower block is larger than said size Sb and searching for similar region of said lower block from a spatial comparison of said reference image and said lower block when the size of said lower block is smaller than said size Sb to detect a motion vector of said lower block with a range in the vicinity of the motion vector of said block, which is a division source, as a start position, and holding the obtained motion vector of said lower block in a tree data structure.

2. An image processing device that finds a motion vector between an original image and a reference image, comprising:

an extraction unit that divides said original image to extract a block; and a search unit that searches for a similar region of said block from said reference image from a comparison of projection components of an image feature amount of said reference image and said block when a size of said block is larger than a predetermined size Sb and searches for said similar region from a spatial comparison of said reference image and said block when the size of said block is smaller than said size Sb to detect a motion vector of said block, wherein:

said extraction unit further divides said block into smaller lower blocks to extract said lower block; and said search unit searches for a similar region of said lower block from said reference image from a comparison of projection components of an image feature amount of said reference image and said lower block when a size of said lower block is larger than said size Sb and searches for said similar region of said lower block from a spatial comparison of said reference image and said lower block when the size of said lower block is smaller than said size Sb to detect a motion vector of said lower block with a range in the vicinity of the motion vector of said block, which is a division source, as a start position, and holds the obtained motion vector of said lower block in a tree data structure.

3. The image processing device according to claim 2, further comprising:

an alignment judgment unit that suspends the detection of motion vector relating to said lower block on a suspensive condition that a change of the motion vector of said lower block has aligned within a predetermined allowable amount.

4. The image processing device according to claim 2, further comprising:

a data structure conversion unit that converts said tree data structure of said motion vector into a data structure of a motion vector for each of the blocks, which is obtained by equally dividing said original image into those of a predetermined size.

5. A non-transitory computer readable medium storing an image processing program, causing a computer to function as an image processing device according to claim 2.

6. The image processing device according to claim 2, wherein

Said extraction unit divides said reference image at equal intervals and hierarchically to extract said block.

7. The image processing device according to claim 2, further comprising:

an edge judgment unit that suspends the detection of motion vector of said lower block on a suspensive condition that an amount of edge components included in said lower block becomes smaller than a predetermined threshold value.

8. The image processing device according to claim 7, wherein:

said search unit further includes a detection continuation unit that continues the detection of motion vector until a size of said lower block becomes a predetermined size Sa or less irrespective of said suspensive condition.

* * * * *